United States Patent [19]

Somezawa et al.

[11] Patent Number: 5,028,497
[45] Date of Patent: Jul. 2, 1991

[54] MAGNETIC RECORDING MEDIUM UTILIZING A FUNGICIDE

[75] Inventors: Masashi Somezawa, Miyagi; Masakazu Muroyama, Kanagawa, both of Japan

[73] Assignee: Sony Corporation, Tokyo, Japan

[21] Appl. No.: 345,235

[22] Filed: May 1, 1989

[30] Foreign Application Priority Data

May 13, 1988 [JP] Japan ............................... 63-116256
Nov. 18, 1988 [JP] Japan ............................... 63-292071

[51] Int. Cl.$^5$ ............................................. G11B 23/00
[52] U.S. Cl. .................................... 428/694; 428/900; 252/62.54; 106/15.05
[58] Field of Search ............................. 428/694, 900; 252/62.54

[56] References Cited

U.S. PATENT DOCUMENTS 3,806,351 4/1974 Bromberg et al. ............ 106/308 Q
4,487,781 12/1984 Morisawa et al. .................. 424/301
4,698,280 10/1987 Mine et al. ...................... 428/425.9

OTHER PUBLICATIONS

Potin, C. et al., (CA103(3)18350u), *Biocidal Polymers for Paint*, 1984.

Primary Examiner—Merrell C. Cashion, Jr.
Assistant Examiner—Stevan A. Resan
Attorney, Agent, or Firm—Hill, Van Santen, Steadman & Simpson

[57] ABSTRACT

A magnetic recording medium having a magnetic layer on one surface of a non-magnetic base and having as required a backcoat layer on the other surface, having at least one of p-tolyldiiodemethylsulfone, 2,3,3-triiodoallyl alcohol and 2-methoxycarbonylaminobenzimidazole and 2-methoxycarbonylaminobenzimidazolium salt as an anti-fungus agent on or in the magnetic layer and/or the backcoat layer.

13 Claims, 1 Drawing Sheet

MAGNETIC RECORDING MEDIUM UTILIZING A FUNGICIDE

BACKGROUND OF THE INVENTION

1. Field of the Invention

The present invention relates to a magnetic recording medium, such as a magnetic tape. More specifically, the present invention relates to a magnetic recording medium that has undergone anti-fungus treatment.

2. Prior Art

Generally, the magnetic layer of a magnetic recording medium is formed by coating a magnetic paint, obtained by dispersing and blending ferromagnetic powders, binders, dispersants, and lubricants in organic solvents, on a non-magnetic substrate, such as a polyester film, or by directly depositing a ferromagnetic metal through a technique such as vacuum deposition. It is also widely practiced to provide a so-called backcoat layer on the other side of the non-magnetic substrate. The backcoat layer is formed by mixing electroconductive carbon black in a binder. This is effective in preventing a loose winding or electrification of the tape, reducing the dropout or friction coefficient, improving running stability, and reducing a transfer of the lubricant from the magnetic layer.

Typically, the binder for the magnetic recording medium consists of synthetic resins, such as vinyl chloride-vinyl acetate-vinyl alcohol copolymer, cellulose derivatives, epoxy resins, polyvinyl butyral, polyurethane resins, synthetic rubber resins, acrylic resins, and polyester resins.

In the magnetic layer and the backcoat layer, described above, various additives, such as dispersants, lubricants, and anti-static agents, are utilized. These are usually a variety of organic compounds such as fatty acids and derivatives thereof, for example fatty acid esters, fatty acid metal salts or fatty acid amides, aliphatio alcohols, and other organic compounds having saturated and unsaturated hydrocarbon groups.

Some of these binders and additives contain compounds that can function as a source of nutrition for fungi. In this regard, certain fungi can grow on these layers by gradually decomposing and absorbing these compounds. When a fungus does grow in the magnetic recording media that utilize these compounds, it can cause the magnetic layer to peel off due to adhesion of tapes to each other, head contamination, deterioration in the tape smoothness and signal errors of the tape or disk. Fungus that grow on these layers can include Aspergillus, Penicillium (blue mold), and Paesilomyces.

To suppress the generation of these fungi or molds, U.S. Pat. No. 4,698,280 discloses a technique that includes adding various anti-fungus agents into the binder of the magnetic layer.

However, the anti-fungus effect of the conventional magnetic recording medium may not be sufficient and there is a demand for the development of a magnetic recording medium having a more potent anti-fungus effect.

SUMMARY OF THE INVENTION

This invention proposes to solve the above-described problems and provides a magnetic recording medium exhibiting a potent anti-fungus effect without affecting the magnetic properties.

Pursuant to the present invention, the magnetic recording medium includes at least one compound chosen from the group consisting of p-tolyldiiodomethylsulfone, 2,3,3-triiodoallyl alcohol, 2-methoxycarbonylaminobenzimidazole, and 2-methoxycarbonylaminobenzimidazolium salt on or in at least one of the magnetic layer or the backcoat layer. The anti-fungus agents used in the present invention effectively suppress the growth of fungi on the magnetic recording medium without deteriorating the dispersibility or magnetic characteristics of the magnetic materials. It is therefore possible to provide a highly reliable magnetic recording medium that can be used conveniently in hot and humid areas where fungi are most likely to be produced.

Additional features and advantages of the present invention are described in and will be apparent from, the detailed description of the presently preferred embodiments and from the drawings.

DETAILED DESCRIPTION OF THE PRESENTLY PREFERRED EMBODIMENTS

The inventors of the present invention have found that it is effective that at least one of p-tolyldiiodomethylsulfone, 2 3 3-triiodoallyl alcohol 2-methoxycarbonylaminobenzimidazole, and 2-methoxycarbonylaminobenzimidazolium salt can be held on at least one of the magnetic layer or the backcoat layer of the magnetic recording medium. This finding has led to the fulfillment of the present invention.

The present invention provides a magnetic recording medium having a magnetic layer on one side of a non-magnetic substrate and a backcoat layer consisting essentially of non-magnetic powder and a binder on the other side; at least one of the magnetic layer and backcoat layer holds at least one compound chosen from the group consisting of p-tolyldiiodomethylsulfone, 2,3,3-triiodoallyl alcohol, 2-methoxycarbonylaminobenzimidazole, and 2-methoxycarbonylaminobenzimidazolium salt as an anti-fungus agent.

With respect to the 2-methoxycarbonylaminobenzimidazolium salt, alkylbenzenesulfonates containing an alkyl group having 7 to 25 carbon atoms are preferred. For example, 2-methoxycarbonyl-aminobenzimidazole dodecylbenzenesulfonate, which is an alkylbenzenesulfonate having an alkyl group with 12 carbon atoms, has desirable properties.

Generally, anti-fungus agents used for magnetic recording medium must exhibit sufficient anti-fungus effects at a low concentration and high safety to humans, as well as, have a sustained anti-fungus effect. Moreover, the anti-fungus agents must not be strong odorants and must be soluble in solvents used for preparing magnetic paints while not deteriorating the dispersibility of the magnetic material or affecting the magnetic properties. The above compounds of the present invention satisfy these requirements.

Figure 1:
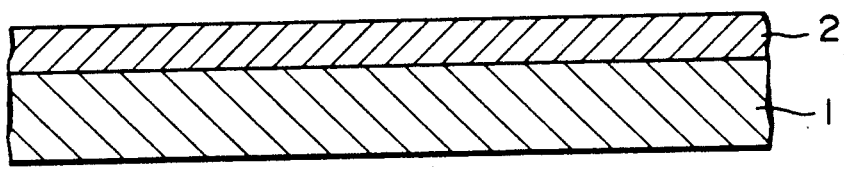
FIG. 1 illustrates an enlarged cross-sectional view of a portion of a magnetic recording medium to which the present invention is applied.
Figure 2:
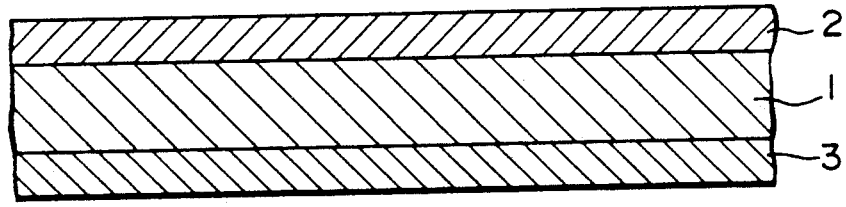
FIG. 2 illustrates an enlarged cross-sectional view of a portion of a magnetic recording medium to which the present invention is applied.

With respect to the construction of the magnetic recording medium to which the present invention is applied, as illustrated in FIG. 1, a magnetic layer 2 is formed on one side of a non-magnetic substrate 1. Alternatively, as illustrated in FIG. 2, a magnetic layer 2 is formed on one side of the non-magnetic substrate 1 and a backcoat layer 3 is formed on the other side. The recording medium can be classified by the methods of forming the magnetic layer into so-called coated type magnetic recording medium in which the magnetic paint film is formed as a magnetic layer by coating a magnetic paint with magnetic powders dispersed therein on the surface of the non-magnetic substrate and so-called thin metal film type magnetic recording medium in which the magnetic thin metal film is formed on the surface of the non-magnetic substrate as the magnetic layer by techniques such as vacuum deposition, sputtering, ion plating, or plating.

A suitable one of the above enumerated methods of using the anti-fungus agents can be selected depending on the type of magnetic recording media. That is, in the coated type magnetic recording media, anti-fungus agents can be added to the magnetic paint, or the layer containing the anti-fungus agents can be applied as a top coat on the magnetic layer. However, because the anti-fungus agents cannot be added to the magnetic layer in the metal thin film type magnetic recording medium, it must be applied through the top coat.

In magnetic recording medium having both a magnetic layer and a backcoat layer, it is sufficient that at least one of them contains the anti-fungus agents by internal addition or top coat. When both the magnetic layer and the top coat layer hold the anti-fungus agents, different methods of using the anti-fungus agents can be employed.

In the case of the internal addition of the anti-fungus agent to the magnetic layer or the backcoat layer, the amount of anti-fungus agent is 0.05 to 8 parts by weight to 100 parts by weight of binder. If an amount less than the above range is utilized, the anti-fungus effect may not be sufficient and, with an amount more than the above range, the magnetic properties may be adversely affected. A preferred range is 0.1 to 5 parts by weight of the anti-fungus agent to 100 parts by weight of the binder.

In the case of a top coat, 0.1 to 200 mg of the anti-fungus agent can be used to 1 $m^2$ of magnetic recording medium.

The above anti-fungus agents can be used alone or in combination with two or more agents.

Any non-magnetic substrates, magnetic powders mixed into the magnetic layer, non-magnetic powders mixed into the backcoat layer, binder mixed into the magnetic layer or the backcoat layer, dispersants, abrasive agents, anti-static agents or rust-proofing agents, or solvents used for preparing magnetic paints in the coated type magnetic recording media, as known in the art, can be used without limitation.

Any of the materials for the above non-magnetic substrates usually employed in this kind of the magnetic recording medium, including polyesters, such as polyethylene terephthalate, polyolefins such as polyethylene or polypropylene, cellulose derivatives such as cellulose triacetate, cellulose diacetate or cellulose acetate butyrate, vinyl resins such as polyvinyl chloride or polyvinylidene chloride, plastics such as polycarbonate, polyimide, polyamide, or polyamide imide, paper, metals such as aluminum or copper, light alloys such as aluminum or titanium alloys, ceramics or single-crystalline silicon, can be used. The non-magnetic substrate can be in the form of a film, tape, sheet, disk, card, drum, or the like.

The magnetic powders include ferromagnetic iron oxide particles, ferromagnetic chromium dioxide, powders of ferromagnetic alloys, and iron nitride.

The above powders of ferromagnetic iron oxide have the general formula $FeO_x$ wherein: $1.33 \leq x \leq 1.50$; that is, maghemite ($\gamma-Fe_2O_3$, $x=1.50$), magnetite ($Fe_3O_4$, $x=1.33$) and the solid solution thereof ($FeO_x$, $1.33 < x < 1.50$). In addition, cobalt may be added to the ferromagnetic iron oxide to elevate its coercivity. The cobalt-containing iron oxide is classified roughly, as a doped type and a coated type.

As the magnetic chromium dioxide, $CrO_2$, having or not having added thereto at least one of Ru, Sn, Te, Sb, Fe, Ti, V, and Mn, with a view toward improving the coercivity, can be used.

As the powders of the magnetic alloy, Fe, Co, Ni, Fe-Co, Fe-Ni, Fe-Co-Ni, Fe-Co-B, Fe-Co-Cr-B, Mn-Bi, Mn-Al, or Fe-Co-V, etc., can be used. These can also be admixed with metal components, such as Al, Si, Ti, Cr, Mn, Cu, or Zn to improve various properties.

Organic or inorganic compounds can be used as non-magnetic powders introduced into the backcoat layer. Examples of these compounds include carbon black, hematite, mica, silica gel, magnesium oxide, zinc sulfide, tungsten carbide, boron nitride, starch, zinc oxide, kaolin, talc, clay, lead sulfate, barium carbonate, calcium carbonate, magnesium carbonate, boehmite ($\gamma-Al_2O_3$ $H_2O$), alumina, tungsten sulfide, titanium oxide polytetrafluoroethylene powders polyethylene powders polyvinyl chloride powders, or metal powders. These can be mixed singly or in combination.

Any known binders used for the magnetic layer or for the backcoat layer can be used, such as vinyl chloride-vinyl acetate copolymer, vinyl chloride-vinyl acetate-vinyl alcohol polymer, vinyl chloride-vinyl acetate-maleic acid copolymer, vinyl chloride-vinylidene chloride copolymer, vinyl chloride-acrylonitrile copolymer, acrylate-acrylonitrile copolymer, acrylate-vinylidene chloride copolymer, methacrylate-vinylidene chloride copolymer, methacrylate-styrene copolymer, thermoplastic polyurethane resin, phenoxy resins, polyvinyl fluoride, vinylidene chloride-acrylonitrile copolymer, butadieneacrylonitrile copolymer, butadiene-acrylonitrile copolymer, acrylonitrile-butadiene-methacrylate copolymer, polyvinyl butyral, cellulose derivatives, styrene-butadiene copolymer, polyester resins, phenol resins, epoxy resins, thermosetting polyurethane resins, urea resins, melamine resins, urea formaldehyde resins, or mixtures thereof. Above all, polyurethane and polyester resins and acrylonitrile-butadiene copolymer, accepted as affording pliability, are preferred.

The organic solvents for preparing the magnetic paint or the backcoat paint can include: ketone type solvents such as acetone, methylethylketone, methylisobutylketone, or cyclohexanone; ester type solvents such as methyl acetate, ethyl acetate, butyl acetate, ethyl lactate, or glycol acetate monoethylether; glycol ether type solvents such as glycol dimethyl ether, glycol monoethyl ether, or dioxane; aromatic hydrocarbon type solvents such as benzene, foluene, or xylene; aliphatic hydrocarbon type solvents such as hexane or haptane; or organochlorine compounds such as methylene chloride, ethylene chloride, carbon tetrachloride, chloroform, ethylene chlorohydrin, or dichlorobenzene.

It should be noted that the magnetic recording medium of the present invention can comprise an under layer between the non-magnetic substrate and the magnetic layer.

By way of example, and not limitation, examples of the present invention will now be given.

EXAMPLES 1 TO 4

In these examples, the anti-fungus agents are added internally in the magnetic layer of the coated type magnetic recording medium having the magnetic layer and the backcoat layer.

A magnetic paint composition for forming a magnetic layer was prepared in accordance with the following composition:

| Co-coated δ-$Fe_2O_3$ (specific surface area, 30 $m^2$/g) | 100 parts by weight |
|---|---|
| nitrocellulose (¼H) | 7.8 parts by weight |
| urethane resin (binder) | 16.7 parts by weight |
| carbon black (anti-static agent) | 8 parts by weight |
| $Cr_2O_3$ (abrasive) | 5 parts by weight |
| stearic acid (lubricant) | 0.5 parts by weight |
| butyl stearate (lubricant) | 1.0 parts by weight |
| methylethylketone (solvent) | 80 parts by weight |
| toluene (solvent) | 80 parts by weight |
| cyclohexanone (solvent) | 40 parts by weight |

To the above magnetic paint composition were added anti-fungus agents of p-tolyldiiodomethylsulfone, 2,3,3-triiodoallyl alcohol, 2-methoxycarbonylaminobenzimidazole, and 2-methoxycarbonylaminobenzimidazole dodecylbenzenesulfonate, at the concentration set forth in Table 1 below. The amount of anti-fungus agent added is indicated in Table 1 by units of PHR, which indicates the concentration per 100 parts by weight of the resin which is to be the binder.

The above composition was mixed for 48 hours in a ball mill, filtered utilizing a 3 μm filter, and admixed with 4.4 parts by weight of a hardener ("Coronate L" manufactured by Nippon Polyurethane Co. Ltd.). The resulting mixture was further mixed for 30 minutes and then applied on a 14.4 μm thick polyethylene terephthalate film to a dry film thickness of 5.5 μm.

A backcoat composition was then prepared in accordance with the following composition:

| carbon black | 5 parts by weight |
|---|---|
| urethane resin (containing 0.30 mol of tertiary amine) | 3.3 parts by weight |
| methylethylketone | 25 parts by weight |

The above composition was mixed in a ball mill for 48 hours, admixed with 2.5 parts by weight of a hardener (Desmodule L, manufactured by Bayer AG) and further mixed for 20 minutes. The resulting mixture was then applied to a surface of the polyethylene terephthalate film, opposite to the surface coated with the magnetic paint composition, annealed at 60° C. for 24 hours, subjected to a magnetic field orientation processing, dried, wound, calendared, and slitted to a width of ½ inch to produce sample tapes.

Cultivation tests were then conducted to determine the anti-fungus effects of these sample tapes.

Two types of magnetic tapes on which molds were produced were recovered from the market and the fungi which grew on these magnetic tapes were respectively cultivated on a JIS Sabouraud's agar medium. Six types of fungi were isolated from one of the tapes and one type of the fungus was isolated from the other tape. Suspensions of the spores of the fungi isolated from each tape were produced. The spore suspension containing the six fungi was named spore suspension A and the spore suspension containing one fungus was named spore suspension B.

The JIS Sabouraud's agar medium was diluted 1/10, having the following:

| glucose | 4 g |
|---|---|
| peptone | 1 g |
| agar | 25 g |
| deionized water | 1000 ml |

A sample piece out to a length of 3 cm from the sample tape was placed at a center of the medium and evenly sprayed by the spore suspensions A and B. The media was capped and maintained at 28±1° C. within an incubator and the status of the growth of fungi was determined after one, two, and three weeks. As a criteria for judgment, in the table, the state in which an inhibition zone is formed or in which no growth of fungi was noticed on the sample tape surface is denoted as 3, the state in which the range of growth of the fungi was less than 1/3 of the sample tape surface is denoted as 2 and the state in which the range of the growth of the fungi was not less than 1/3 of the sample tape surface is denoted as 1.

The results are set forth in Table 1.

COMPARATIVE EXAMPLES 1 TO 7

For comparison, p-chloro-m-xylenol, p-oxibutyl benzoate, dehydroacetic acid, o-phenylphenol and α-bromocinnamaldehyde and N-(fluorodichloromethylthio)phthalimide, proven anti-fungus agents, were added at the ratio shown in Table 1 and sample tapes were produced as in Examples 1 to 4.

Blank sample tapes not admixed with anti-fungus agents were also prepared.

The results are also set forth in Table 1.

TABLE 1

| Ex/Comp. Ex | Anti-Fungus Agents | Conc (PHR) | spore suspension A | | | spore suspension B | | |
|---|---|---|---|---|---|---|---|---|
| | | | after 1 week | after 2 weeks | after 3 weeks | after 1 week | after 2 weeks | after 3 weeks |
| Ex. 1 | p-tolyldiiodomethyl-sulfone | 0.54 | 2 | 2 | 2 | 2 | 2 | 2 |
| | | 0.90 | 3 | 2 | 2 | 3 | 3 | 2 |
| | | 1.80 | 3 | 2 | 2 | 3 | 3 | 3 |
| Ex. 2 | 2,3,3-triiodoallyl alcohol | 0.54 | 3 | 2 | 2 | 3 | 2 | 2 |
| | | 0.90 | 3 | 3 | 3 | 3 | 2 | 2 |
| | | 1.80 | 3 | 3 | 3 | 3 | 3 | 2 |
| Ex. 3 | 2-methoxycarbonyl-aminobenzimidazole | 0.54 | 3 | 2 | 2 | 3 | 2 | 2 |
| | | 0.90 | 3 | 3 | 3 | 3 | 3 | 3 |
| | | 1.80 | 3 | 3 | 3 | 3 | 3 | 3 |
| Ex. 4 | 2-methoxycarbonylbenz-imidazole dodecyl-benzoate | 0.54 | 3 | 3 | 3 | 3 | 2 | 2 |
| | | 0.90 | 3 | 3 | 3 | 3 | 3 | 3 |
| | | 1.80 | 3 | 3 | 3 | 3 | 3 | 3 |

TABLE 1-continued

| Ex/Comp. Ex | Anti-Fungus Agents | Conc (PHR) | spore suspension A | | | spore suspension B | | |
|---|---|---|---|---|---|---|---|---|
| | | | after 1 week | after 2 weeks | after 3 weeks | after 1 week | after 2 weeks | after 3 weeks |
| Comp. Ex. 1 | p-chloro-m-xylenol | 0.54 | 2 | 2 | 2 | 1 | 1 | 1 |
| | | 0.90 | 2 | 2 | 2 | 1 | 1 | 1 |
| | | 1.80 | 2 | 2 | 2 | 1 | 1 | 1 |
| Comp. Ex. 2 | p-oxibutyl benzoate | 0.54 | 2 | 2 | 2 | 1 | 1 | 1 |
| | | 0.90 | 2 | 2 | 2 | 1 | 1 | 1 |
| | | 1.80 | 2 | 2 | 2 | 1 | 1 | 1 |
| Comp. Ex. 3 | dehydroacetic acid | 0.54 | 2 | 2 | 2 | 1 | 1 | 1 |
| | | 0.90 | 2 | 2 | 2 | 1 | 1 | 1 |
| | | 1.80 | 2 | 2 | 2 | 1 | 1 | 1 |
| Comp. Ex. 4 | o-phenylphenol | 0.54 | 2 | 2 | 2 | 1 | 1 | 1 |
| | | 0.90 | 2 | 2 | 2 | 1 | 1 | 1 |
| | | 1.80 | 2 | 2 | 2 | 1 | 1 | 1 |
| Comp. Ex. 5 | α-bromocinnam-aldehyde | 0.54 | 2 | 2 | 2 | 2 | 2 | 2 |
| | | 0.90 | 2 | 2 | 2 | 3 | 2 | 2 |
| | | 1.80 | 2 | 2 | 2 | 3 | 2 | 2 |
| Comp. Ex. 6 | N-(fluorodichloromethylthio) phthalimide | 0.54 | 2 | 2 | 2 | 2 | 1 | 1 |
| | | 0.90 | 2 | 2 | 2 | 2 | 1 | 1 |
| | | 1.80 | 3 | 2 | 2 | 2 | 1 | 1 |
| Comp. Ex. 7 | — | — | 2 | 2 | 2 | 1 | 1 | 1 |

As illustrated in Table 1, the Comparative Examples 1 to 6 utilizing the conventional anti-fungus agents are not vitally different from the Comparative Example 7 for the blank, although the anti-fungus effects are somewhat improved in the Comparative Example 6.

On the other hand, anti-fungus effects were improved unexceptionably in the Examples 1 to 4 employing the anti-fungus agents according to the present invention and conspicuous effects were displayed above all in Example 4 wherein 2-methoxycarbonylaminobenzimidazole dodecylbenzene sulfonate was used. The magnetic properties were not degraded by the addition of these anti-fungus agents.

Optimum results were also obtained when these anti-fungus agents were added to the backcoat layer.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A magnetic recording medium comprising a non-magnetic base and a magnetic layer provided on one surface of said non-magnetic base, the magnetic recording medium including at least one anti-fungus agent selected from the group consisting of p-tolyldiiodomethylsulfone, 2,3,3-triiodoallylalcohol, 2-methoxycarbonylaminobenzimidazole, and 2-methoxycarbonylaminobenzimidazolium salt.

2. The magnetic recording medium of claim 1 wherein said anti-fungus agent is contained in said magnetic layer.

3. The magnetic recording medium of claim 1 wherein said anti-fungus agent is contained in a layer provided on a surface of said magnetic layer.

4. The magnetic recording medium of claim 1 wherein said anti-fungus agent is contained in a backcoat layer provided on a surface of said non-magnetic base opposite to the surface on which said magnetic layer is formed.

5. The magnetic recording medium of claim 1 wherein the 2-methoxycarbonylaminobenzimidazolium salt is alkylbenzenesulfonate having 7 to 25 carbon atoms.

6. The magnetic recording medium of claim 1 wherein said magnetic layer is composed of binder and magnetic powder.

7. The magnetic recording medium of claim 1 wherein said magnetic layer is composed of ferromagnetic metal thin film.

8. The magnetic recording medium of claim 2 wherein the content of anti-fungus agent is in a range of from approximately 0.05 to about 8 parts by weight for 100 parts by weight of the total binder contained therein.

9. The magnetic recording medium of claim 2 wherein the content of anti-fungus agent is in a range of from approximately 0.1 to about 5 parts by weight for 100 parts by weight of the total binder contained therein.

10. The magnetic recording medium of claim 3 wherein the content of anti-fungus agent is in a range of from approximately 0.1 to about 200 mg/m².

11. The magnetic recording medium of claim 4 wherein the content of anti-fungus agent is in a range of from approximately 0.05 to about B parts by weight for 100 parts by weight of the total binder contained therein.

12. The magnetic recording medium of claim 4 wherein the content of anti-fungus agent is in a range of from 0.1 to 5 parts by weight for 100 parts by weight of the total binder contained therein.

13. A magnetic recording medium comprising a non-magnetic base and a magnetic layer provided on one surface of said non-magnetic base, and a backcoat layer on a second surface of the base, the magnetic recording medium including at least one anti-fungus agent selected from the group consisting of p-tolyldiiodomethylsulfone, 2,3,3-triiodoallylalcohol, 2-methoxycarbonylaminobenzimidazole, and 2-methoxycarbonylaminobenzimidazolium salt.

* * * * *